(12) United States Patent
Rosenstock

(10) Patent No.: US 6,460,462 B1
(45) Date of Patent: Oct. 8, 2002

(54) METHOD OF BLASTING OF ROCK MASS

(75) Inventor: Jochen Rosenstock, Bückeburg (DE)

(73) Assignee: Roboth Vertriebsgesellshaft mbH, Essen (DE)

( * ) Notice: Subject to any disclaimer, the term of this patent is extended or adjusted under 35 U.S.C. 154(b) by 0 days.

(21) Appl. No.: 09/557,228

(22) Filed: Apr. 24, 2000

(30) Foreign Application Priority Data

Apr. 23, 1999 (DE) .......................................... 199 18 491

(51) Int. Cl.7 ................................................. F42D 3/04
(52) U.S. Cl. ........................ 102/302; 102/312; 102/313
(58) Field of Search ................................. 102/302, 312, 102/313

(56) References Cited

U.S. PATENT DOCUMENTS

| 3,902,422 A | * | 9/1975 | Coursen | 102/312 X |
| 3,973,497 A | * | 8/1976 | Coursen | 102/312 |
| 4,333,684 A | * | 6/1982 | Ricketts et al. | 102/312 X |
| 4,777,880 A | * | 10/1988 | Beattie et al. | 102/313 X |
| 4,815,385 A | * | 3/1989 | Kingery et al. | 102/313 X |
| 5,014,622 A | * | 5/1991 | Jullian | 102/313 X |
| 5,388,521 A | * | 2/1995 | Coursen | 102/313 X |
| 6,014,933 A | * | 1/2000 | Umphries et al. | 102/313 X |

FOREIGN PATENT DOCUMENTS

| JP | 4/165300 | * | 6/1992 | 102/312 |
| SU | 1122887 | * | 11/1984 | 102/312 |
| WO | 91/04455 | * | 4/1991 | 102/312 |

* cited by examiner

Primary Examiner—Peter A. Nelson

(57) ABSTRACT

A method of blasting rock or similar materials in surface and underground mining operations is described in which neighboring bore holes are charged with explosives and primed with detonators. The detonators are programmed with respective delay intervals according to the firing pattern and the mineralogical/geological environment and the resulting seismic velocities.

10 Claims, 4 Drawing Sheets

METHOD OF BLASTING OF ROCK MASS

FIELD OF THE INVENTION

This invention concerns field of the Invention rock or similar materials in surface or underground mining operations where bore holes are charged with explosives and detonators.

BACKGROUND OF THE INVENTION

Such blasting technologies are known from experience respectively from European patent application 0 147 688 A2 and the German disclosure document DE 197 21 839 A1.

It was discovered that for such blasting technologies the applied detonating agents have a decisive influence on the quality of the blast. Here discrimination is made between electric, nonelectric and electronic detonators.

Electric detonators feature a pyrotechnical compound together with a filament, which is heated by electric energy. A non-electric detonator mostly consists of a thin plastic hose containing explosives. This hose is ignited by an impact, respectively a fuse cap. The plastic hose then ignites the pyrotechnical delay composition in the detonator.

Electronic detonators do not need a pyrotechnical compound. They get the ignition energy from an energy-storing device like e.g. a capacitor. This capacitor heats a filament or any other device, which can be heated by electricity. Basically this is already described in the European document and the German disclosure document DE 197 21 839 A1. The blasting technologies known until now are not fully convincing. Because until now only a mutual support of neighboring bore holes can be achieved in the same row of bore holes in the sense of intensifying the disintegration of the rock masses to be blasted. In other words, the energy of a subsequent shot cannot or can only insufficiently be coupled to the energy of the preceding shot. Furthermore, such phenomena could until now only be observed by chance and they could not be predicted. This invention is supposed to improve this situation altogether.

This invention is based on the technical problem of further developing such a technology in a way that a focused mutual impact of the shock waves coming from the individual bore holes can be achieved.

To solve this task it is proposed by this invention utilizing a technology for blasting rock or similar material that electronic detonators and their respective time delays are programmed in consideration of the mineralogical and geological environment and the seismic velocities resulting thereof and the respective firing patterns. In most cases, an electronic detonator with a continuously, variable programmable moment of ignition is applied. With such electronic detonators, it is possible for the first time to freely program variable delay intervals from one detonator to the other, respectively from bore hole to bore hole. This is basically because electronic detonators, as mentioned before, do not have a pyrotechnical firing compound. Rather, they have an electronic switch which is connected after the battery (respectively the capacitor) that allows the electric energy to flow into the ignition device of the detonator when switched on. This electronic switch, specifically a switching transistor, can be correspondingly controlled by a data control part inclusive a control unit—i.e., actually a computer in form of a microchip. This design enables the electronic detonator to be accurately detonated with accuracy of one millisecond.

In order to increase the explosive effect, the invention proposes that shock wave fronts coming from the respective bore holes interfere with each other in order to open the structure of the rock to be blasted. So there is a wave interference of the shock waves and a wave interference of the seismic waves. This colliding and inter-reacting of various multiple wave fronts leads to the desired fracture of the structure, i.e. the connections in the respective solids are loosened from the excitation from the outside.

Shock waves are generally understood as being three-dimensionally spreading, abrupt and consistent changes of density, pressure and/or temperature of the material to be blasted. Such a shock wave develops when a huge amount of energy is suddenly released—such as by an explosion or the ignition of an explosive charge in a bore hole with the help of the (electronic) detonator. The leading edge of this spreading of energy represents a shock wave. The propagation velocity of this shock wave can be a multiple of the sonic velocity of the surrounding medium and mainly travels at supersonic speed.

Within the framework of this particular invention, seismic waves shall not only be regarded as shock waves, or tremor waves, but any kind of vibration waves which travel away from an epicenter (mostly a bore hole with an explosive charge) in the rock to be blasted.

As the propagation velocity of the respective seismic wave—apart from the so-called pressure waves or shock waves—depends on the material and its ability to be compressed, there is a certain and characteristic propagation speed at a given density and temperature, the sonic speed. This represents a parameter depending on the material and can, in case of rock mass, amount to more than 1,000 m/sec or even several 1,000 m/sec.

The field of elastic deformation and the given compressibility of the rock, which conducts the seismic wave or the sound wave are of concern if only waves with small amplitude are excited in the rock. If there is a bigger and sudden excitation, then the shock waves, or tremor waves are created. They have the favorable effect that at least in the area of the blast the atoms in the solid lattice are not elastically deformed against each other anymore, so their connections break up. The solid structure is destroyed (for the most part).

As the shock wave velocity is mostly supersonic, this speed amounts to Mach 1 and more. For the increase of the explosive effect, the firing sequence is arranged in such a way that the shock waves from the individual bore holes and the seismic waves, particularly sound waves, overlap and interfere [amplify]. The shock wave system in the area of the blast is being compressed. This means that wave amplitudes are created, which result from the (positive) overlapping of individual shock waves. This can be controlled with programmable delays in such a way that, altogether a shock wave system is created by the wave velocities of which propagate supersonically, i.e. their speed is above mach 1.

The procedure here is as follows. The sequence of ignition is arranged in such a way that the accumulated sum of the delay times is smaller than the traveling time of the sonic speed resulting from the rock to be blasted. In other words, the delays between the first bore hole to be fired and the last bore hole to be fired are chosen in such a way that the velocity of the ignition (horizontal ignition velocity) is equal to or faster than the sonic speed in the material to be blasted (rock velocity).

By this, it is possible to create calculated delay models of the individual ignition sequences, so called firing patterns. The choice of the individual delays determines the fragmentation of the blasted material (pile of debris). It even determines the distribution respectively of the accumulation of the material in the area of the blast. This is because individual seismic waves interfere in such a way that, at certain spatially exactly defined spots, wave interference peaks happen, leading to a particularly extensive fracture of the rock masses to be blasted in this particular area. But the wave interference minima, on the other hand, correspond in such a way that only a limited fracture of the rock is achieved.

But as the seismic waves spread from the respective bore hole with the sonic speed through the respective rock, the wave patterns move and hence the wave interference peaks and minima travel as well. This can either happen in the shape of counteracting or paralelly running waves and/or shock waves.

Thus, it can be observed as the overall result, that there are compression effects by the described wave collisions resulting from the multiple oscillations or flow of the respective wave fronts through the rock masses. Due to the specific sequence of ignition of the explosives charges detonating one after the other, it results in an almost continuous process of creating a seismic wave interference, or shock wave, with the character of a constant flow. As a result, the rock masses in the blasted area are transformed into a mineral mixture with a colloidal-mechanical cohesion.

In the blasted area, the shock wave's or the seismic wave created by the blast has a particularly high frequency. This high-frequency shock wave approaches the sonic speed of the rock to be blasted and its natural frequency, depending on the distance from the source of excitation.

The shock effect described previously comes as a result of an excitation by impulse of the rock due to the detonation of the explosives in the bore hole, which corresponds to the ultra-high frequencies in the range of 400 Hz up to several kHz.

The frequency and the amplitude of these shock waves are able to excite the solid structure of the rock in the close range area (blast area) to such an extent that this leads to a partial or complete disintegration of the solid. Consequently, the close range area determines the actual blast areas where the seismic wave, or the shock wave, spreads concentrically from the center of the source of excitation, i.e. the explosive charge or the bore hole.

It is furthermore possible in the frame of this invention to place an electronic detonator at the bottom of the bore hole and a second one on top of the charge column at the mouth of the bore hole. These detonators can now be programmed to exactly the same delay, or different delays such that two shock wave fronts, or detonation fronts, are created, which collide in the middle of the charge column. This leads to a doubling of the velocity of detonation and to an increased conversion of the charge column due to the colliding shock wave fronts.

As previously described, the freely programmable delays and the resulting ignition velocity directly depend on the sonic speed in the rock to be blasted. This means, in other words, that the ignition velocity has to be synchronized with the physical velocities (particularly the speed of sound).

SUMMARY OF THE INVENTION

To achieve this, the invention proposes that the seismic velocity, respectively the sonic speed in the rock to be blasted, be determined in advance by measurement and/or by calculation, before the firing pattern is developed. This can be done by, e.g., having a look at the boring log, which provides a fairly precise picture of the rock formation. The seismic velocities to be expected can be discerned from the boring log and the necessary horizontal ignition velocity (velocity of the ignition from the first bore hole to be detonated to the last bore hole to be detonated) can be determined.

Basically, it is also possible to use bore holes at the back edge of the area to be blasted to create counteracting shock waves, respectively seismic waves. Thus, it is possible to define the blasted area in a way which was not believed possible with the current state of the art. This is made possible by the freely programmable firing pattern with its varying delays from one blast to the other.

In addition to the seismic wave, or shock wave, the blasted rock is further fragmented by a gas pressure wave, which follows after the detonation of the explosives. This one is produced with a slower propagation velocity, compared to that of the seismic wave and is called the detonation shock wave velocity. This gas pressure wave amplifies the explosive effect of the shock wave by penetrating the cracks in the rock, which were created by the shock wave.

In this context, the invention also demands that the shock wave velocity, or the seismic velocity, and the detonation shock wave velocity are synchronized as they are subsonic.

This synchronization of the shock wave velocities and the detonation shock wave velocity can be traced back to the fact that the detonation shock wave velocity depends on the structure and the cohesive strength of the material to be blasted. In general it can be said that the smaller the grain size of the pile of debris after the blast, the greater the detonation's shock wave velocity. This is a result of the wave interferences of the shock waves.

It is also possible within the framework of this invention not only to discriminate between pre-split blasts and production blasts, but also to synchronize them. Pre-split rows are certain rows of bore holes at the back edge of the drilling pattern. These pre-split rows are meant to form the boundary of the actual blast area and shall, among other things, create an even and sturdy bench wall. So it is possible that such pre-split holes surround the entire blast area or at least limit one side where the straight and sturdy bench wall is desired. The detonation of the charges in the pre-split holes is called the pre-split blast. In contrast to this, production blasts are meant to loosen the material in the actual blast area.

By the precise programming of the delays of the applied electronic detonators, it is possible to synchronize the pre-split blast and the production blast. In general, the production blast is ignited slightly ahead of the pre-split blast. So the seismic waves from the bore holes of the production blast create wave interferences with the seismic waves of the pre-split holes.

It is assumed that the directions of propagation are more or less contrary and hence there is a wave collision in the center of the blasted area. This effect is further increased by the seismic waves from the production bore holes which were ignited first and which are reflected from the exposed face.

In any case, the synchronization between the pre-split blast and the production blast is carried out in such a way that the vibrations in the blast area are neutralized, which, in the ideal case, would mean that there are almost no vibrations in the blasted area and in the bench wall.

It is also in the scope of this invention to temporarily combine individual bore hole blasts or rows to a bore hole row respectively pre-split bore hole row to be simultaneously ignited. Also, individual production bore holes can be linked and then ignited together. This is basically true for all bore holes no matter whether they are production holes or pre-split holes. Consequently bore hole patterns, ignition sequences, or firing patterns, and corresponding ignition delays can be freely programmed between each other.

The pre-split technology described here enables a clear definition of the blast area in sensitive and even in inhabited areas. Here the pre-split row represents a reflection face for the production blast. A firing pattern with several rows of bore holes and in which the detonators are ignited following a firing pattern which overlaps the individual rows or is in a triangular or circular configuration is also part of the invention.

Electronic detonators allow total control of the programmed ignition delays. This not only makes it possible to control the velocity of detonation of explosives, but also to manipulate the explosive effect in the respective bore holes. This has already been described with the application of two detonators per charge column (one on the bottom plus one on the surface).

An additional advantage of the invention is that, with the design of the firing pattern or the combination of the ignitions amongst each other and the programming of those, a new level of effectiveness is created. Now the result of the blast can not only be influenced by the geometry of the bore hole and the applied explosives but also by the described programming and design of the firing sequence.

From the vibrations outside the area of the blast information for damage control can be gained. They also provide important information for succeeding blasts. The seismic waves also provide information about the sonic speed in the material for succeeding blasts. Actually the seismic waves propagating themselves in the long distance are showing naturally excellent base values for succeeding blasts to be performed at this place (especially the sound velocity in the affiliated material). These seismically obtained values are of course useful for the determination of the ignition velocities—particularly the so-called horizontal ignition velocity as described before. Here it is imperative that the last bore hole to be ignited must detonate before the shock wave of the first bore hole to be detonated arrives.

Thus, with the application of the newly described procedure, the amount of explosives can be considerably reduced as the wave interferences of the seismic waves, or shock waves, deliberately and properly utilized by the new procedure. Additionally, fewer bore holes are needed. Furthermore, the invention makes it possible to clearly define the area of the blast by producing counteracting shock waves at the back edge of the blast, thus defining a tightly enclosed blast area and reducing, to a minimum, the encroachment of the blasts into the environment outside the area.

In contrast to the current state of the art, and when short distances between the bore holes are concerned, the so-called sympathetic transmission from one bore hole to the other can be avoided. This means that there is absolutely no compression of an explosive charge in the neighboring bore hole by the shock wave produced when firing the first bore hole. Thus, false ignitions are excluded as may happen with other ignition technologies because the charge column of a bore hole has already been detonated before the seismic wave or the shock wave of the neighboring bore hole is felt. So no damage is caused to the charge column before it is detonated.

A further consequence of this technology is that the blasting operations themselves become considerably much safer and easier. Basically the observation of additional safety standards, as laid down in the already mentioned German disclosure document 197 21 839 A1 can be taken as granted.

In the following, the invention is described with the help of figures which represent merely one possible embodiment (preferred) of the invention:

DETAILED DESCRIPTION OF THE PREFERRED EMBODIMENTS

Figure 1:
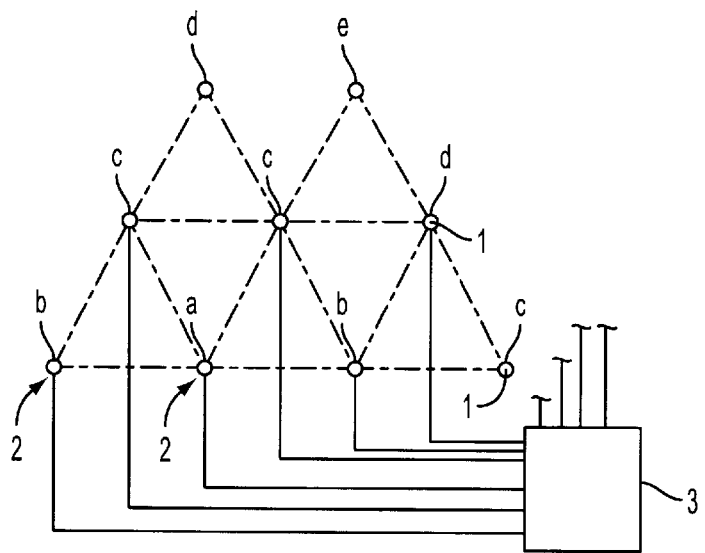
FIG. 1 shows a schematic of a drilling pattern with three rows of reticulated bore holes.
Figure 5:
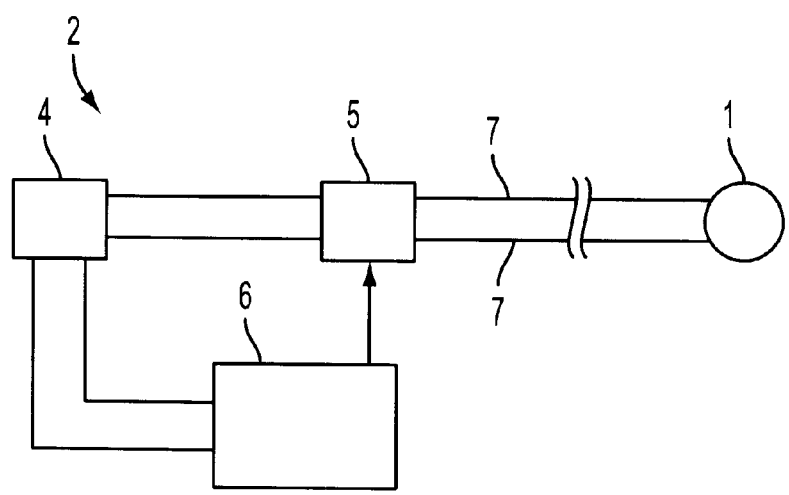
FIG. 5 is a schematic depiction of an electronic detonator.

FIG. 1 shows a drilling pattern with individual bore holes 1 charged with detonators 2 which are all connected to a central control unit 3. These detonators 2 are electronic detonators designed as shown in FIG. 5. The electronic detonator 2 is equipped with an energy storage 4 in form of one or several capacitors. This energy unit 4 is connected to an electronic switch 5, which is a switching transistor controlled with the aid of a data control unit or computer unit or a microchip 6. As soon as this microchip or computer 6 closes the electronic switch 5, the electric energy supplied by the energy storage 4 is available at the corresponding firing cables 7 which ignite directly the explosive charge that is not depicted here. There are, of course, other vital parts belonging to the system of the electronic detonator 2, like the power supply and/or rectifier, details of which can be taken from DE-OS 197-21 839.

It becomes obvious that with the assistance of the electronic switch 5, which is controlled by the microchip 6, the ignition of the explosives charge can be carried out very precisely in the range of less than one millisecond. The central control unit 3 is responsible for the synchronization of the individual detonators 2. Basically, such a central control unit 3 is not needed. However, the individual detonators 2 will have to be programmed when being introduced into the corresponding bore hole 1.

The control unit 3 allows a central programming of the firing pattern and, of course, any change to it, if required. The detonators 2 are freely programmable and because of this, a firing pattern can be designed, taking the geological and/or mineralogical environment into full consideration, i.e. any desired firing sequence or firing pattern, can be designed.

The majority of blasts consist of several rows of bore holes 1. Here the detonators 2—using the central control unit 3—are connected to each other in such a way and are detonated in a way that there is a firing in an overlapping pattern. In the example depicted in FIG. 1, the bore holes 1 are arranged triangularly. The variants depicted in FIG. 2 and 3 have a circular arrangement of the bore holes 1. This also applies for the drilling pattern in FIG. 4.

Research, or measurements and/or simulations enable an estimation with which sonic speed the seismic waves (caused by each blast) travel through the breaking rock in the course of the blast. Such knowledge can also be gained, e.g. from boring loss. Possible geological inconsistencies have no major importance, as long as it is made sure that the so-called horizontal ignition velocity $V_{hi}$ is greater than or equal to the sonic speed in the rock, the so called rock velocity $V_r$. Hence the following should apply:

$$V_{hi} \geq V_r$$

As long as this relationship (of course including a safety buffer) is being adhered to, the geological environment is only of minor importance for a blast carried out following this invention. Because within the framework of this invention it is always ensured that a shock wave coming from bore hole 1 only reaches the neighboring bore hole 1 when it has already been ignited (see FIG. 4 for example). As a result, there is an aimed spreading and creation of continuous shock wave patterns, which interact with each other in the desired and determining mode.

In FIG. 1, the bore holes 1 are marked a, b, c, d and e. The bore hole marked "a" is ignited first followed by the other bore holes 1 marked "b" etc. Therefore, the lower case letters (a, b, c . . . ) represent the firing sequence or the firing pattern. It becomes obvious that three (or more) rows of bore holes are reticulated with each other, featuring an overlapping inter-row firing pattern.

The blast starts with bore hole 1 marked "a" as a single shot. This single shot "a" can be delayed—corresponding to the bore hole depth—towards the following shots in such a manner that an upward movement of the material in the area of the first shot can be achieved. For this, triangular components are circularly arranged around this single shot "a" in such a manner that they can effect into the upward movement created by the single shot "a". Thus an increased amount of the energy of the blast can be utilized for the destruction of the material, which leads to the above mentioned fragmentation.

Figure 2:
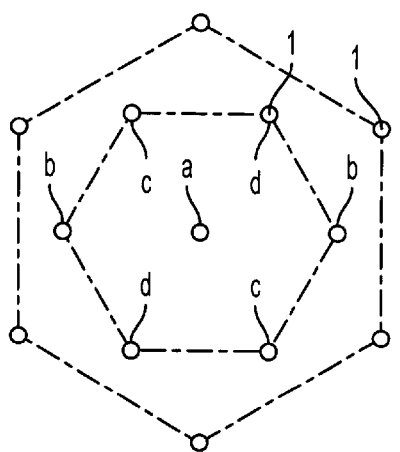
FIG. 2 shows another drilling pattern.
Figure 3:
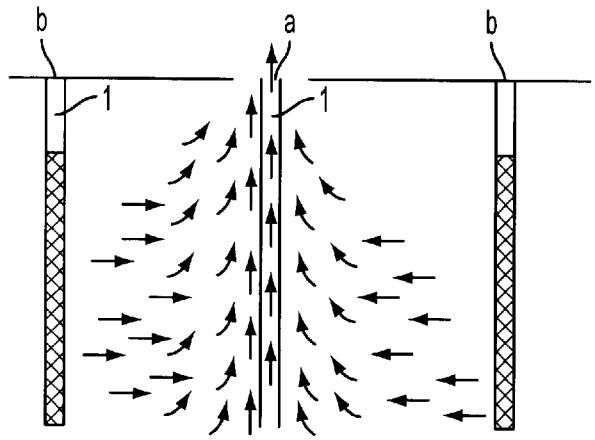
FIG. 3 is a sectional view of the drilling pattern in FIG. 2.
Figure 4:
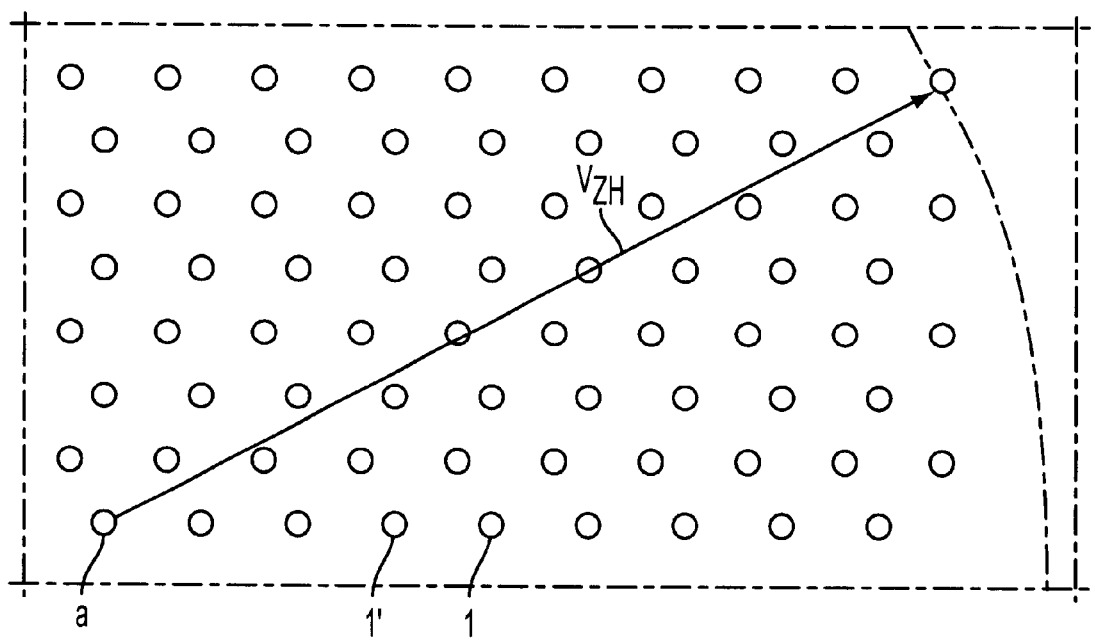
FIG. 4 depicts yet another modified drilling pattern.

As depicted in FIG. 2, several opening circles can be arranged around a symmetric center which is marked as "a". Now the bore holes 1 (b) situated opposite to each other are detonated in pairs and at the same time. By doing so, the complete opening of the bore hole 1 which is detonated first (marked "a") can be fully achieved. This can be clearly seen in the crosscut of FIG. 3. FIG. 4 shows the horizontal ignition velocity $V_{hi}$ as per this invention, which, as described before, always has to be greater than or equal to the rock velocity $V_r$ (determined previously).

Figure 6:
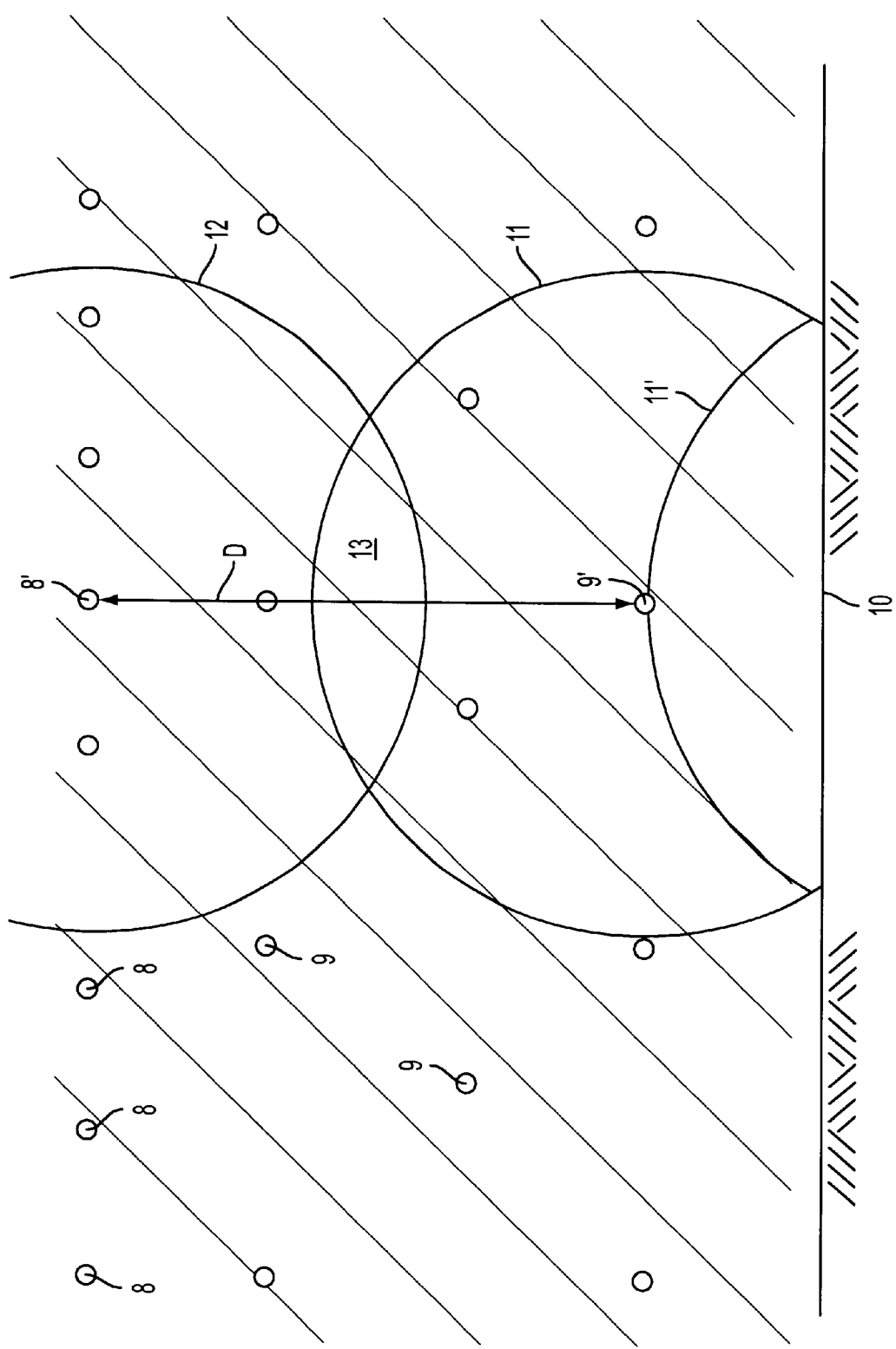
FIG. 6 depicts a drilling pattern for a pre-split blast.

In FIG. 6, a pre-split row of bore holes 8 is shown. There are also production bore holes 9. Additionally, there is the so-called free face 10 which can be a discontinuity of the rock structure, and which causes in the way depicted here a reflection of the seismic waves created by the production bore holes 9. In this example the pre-split bore holes 8 are detonated altogether, or in groups. This also applies for the production bore holes 9. This is described by the respective shock wave fronts 11, 12. Here shock wave front 11 corresponds to the firstly detonated production bore hole 9. The reflected shock wave front 11 also belongs to this hole.

In a short temporal distance, after the detonation of production bore hole 9, the corresponding pre-split bore hole 8 is detonated. As a result, the shock wave front 12 travels a shorter distance compared to that of shock wave front 11. In area 13, a wave interference between the shock wave fronts 11 and 12 take place. This area 13 expands with the further traveling shock wave fronts 11 and 12 up to the free face 10 and ensures that the vibrations in area 13 are considerably reduced due to the collisions of the shock waves. It is thus avoided that seismic waves expand to a greater extent beyond the actual area of the blast (hatched). The reflected shock wave fronts 11 increase the muffling effect described here.

Again, the basic procedure is that a distance D between production hole 9 and the presplit hole 8 influences the temporal delay $\Delta T$ of the respective moments of ignition, and taking the rock velocity $V_r$ into consideration, as follows:

$$\Delta T \leq D/V_r$$

Of course the seismic waves created by the detonation of the respective bore hole 1 spread concentrically as spherical waves with possible sound wave velocities of 1,000 m/sec and more. In the process shock waves coming from the individual bore holes 1 interfere spatially and temporally and depending on the chosen delays between the individual detonators 2, it is possible to create the desired wave interference patterns in the area of the blast. These wave interference patterns can form a wave that travels through the entire area of the blast. Shock waves in the opposite direction produced at the back break of the blast area ensures that the seismic waves are more or less completely erased at the back break of the blast area so that impairments beyond the area of the blast are completely avoided or at least kept to an absolute minimum (see FIG. 6). The aim is to create a spherical wave that, with respect to its propagation velocity, amplitude and direction can be predetermined due to the multiple wave interferences which achieves the desired fragmentation of the material to be blasted.

Figure 7:
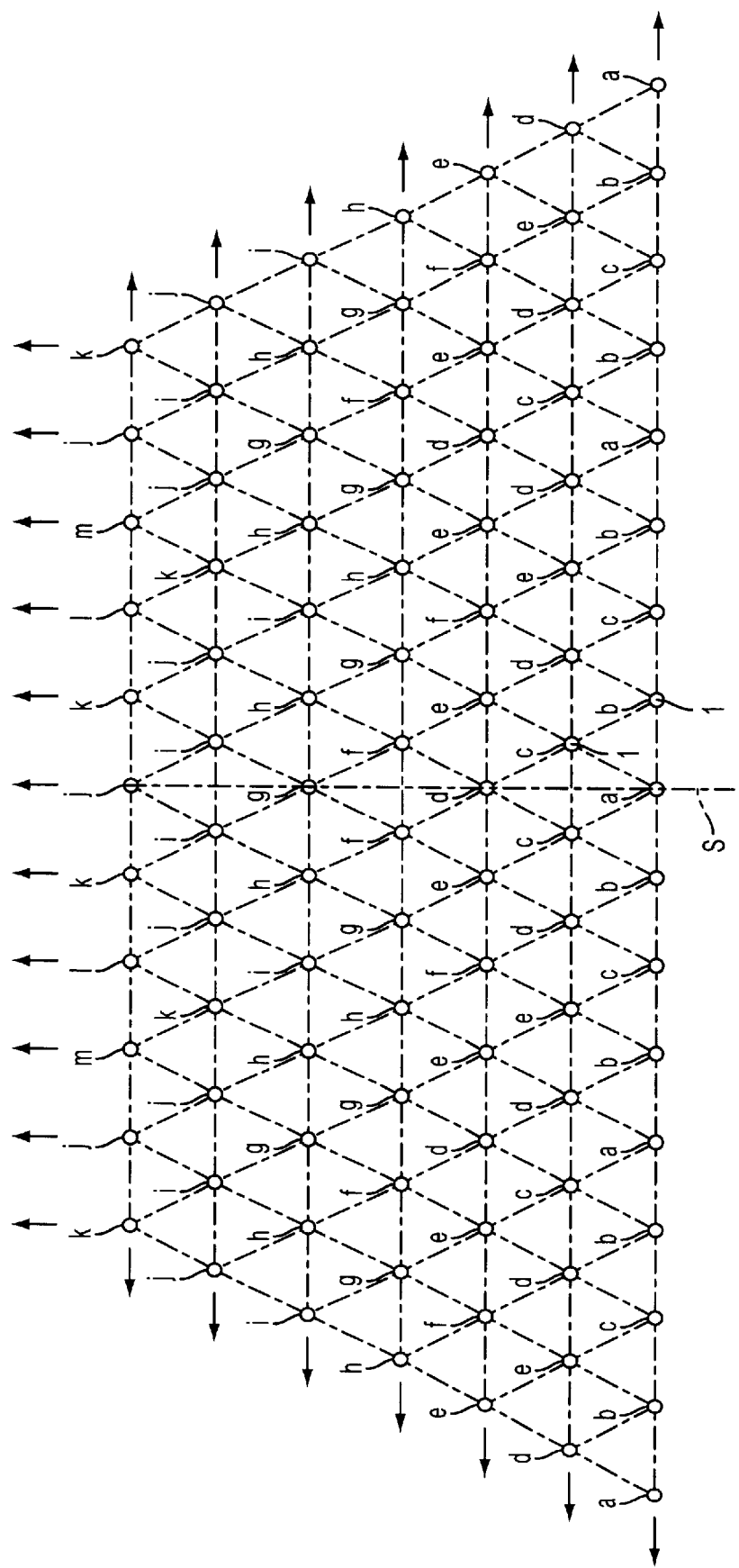
FIG. 7 depicts an additional drilling pattern of which the FIG. 1 represents a section.

In the frame of FIG. 7, there is shown a drilling pattern supplement in comparison to FIG. 1. Again, the sequence of the blasts is marked with the lower case letters a, b, c, d, e, f, g, etc. If, for example, the single shot "a" is representing the start of the blast, it will be followed by the blast of the bore holes 1, marked with b, i.e. in the present case in a time distance of approximately 40 up to 60 ms. Naturally this especially depends on the distance of single bore holes 1 to each other and the rock morphology to be disintegrated. After blast "b", there are following the bore holes with the marking c, i.e. in a distance of 3 up to 10 ms in comparison to the bore holes "b". Also, the time intervals to the succeeding blasts d, e, f, etc. are similar.

The last shown bore hole 1 to be blasted marked with 1, is ignited approximately 90 up to 100 ms after the bore hole 1 with the marking "a". Here the distance between bore hole 1 with the marking "a", which is ignited first, compared with the bore hole 1 with the marking 1, which is ignited last, is amounting to approximately 200 m. Consequently, a horizontal ignition velocity $V_{hi}$ of approximately 2000 m/sec is calculated. This horizontal ignition velocity $V_{hi}$ is clearly higher allocated than the rock velocity $V_r$, which did not even reach 1000 m/sec in the depicted example, i.e. the previously explained relation $$V_{hi} \geq V_r$$

is valid.

The bore hole pattern depicted in FIG. 7 is laid out mirror-symmetrically directed to an axis of symmetry S. Moreover it shows that the respective succeeding ignitions are shared over at least two neighboring ignition rows, therefore resulting in the already mentioned row overlapping ignition pattern. Moreover the bore holes 1 generally will be ignited continuously from row to row. By this, ongoing shock waves are created running from the first row over the whole blasting area. Naturally the ignition delay between neighboring bore holes 1 is again allocated in such way that the neighboring bore hole 1 is already detonated on arrival of the shock wave. Finally, it should be emphasized that values stated for velocities and ignition delays are naturally to be considered as mere examples naturally to be varied depending on geological environment.

Depending on the extent of the disintegration of the rock, described above, the gas pressure wave follows the seismic wave with a certain velocity.

This gas pressure wave is created after the transformation of the explosives and has a lower propagation velocity than the seismic wave. In most of the cases, this propagation velocity is lower than the sonic speed, whereas the velocities of the shock waves are to be found in the supersonic area.

While the preferred embodiments of the invention have been depicted in detail, modification and adaptations may be made thereto, without departing from the spirit and scope of the invention, as delineated in the following claims:

What is claimed is:

1. A method of blasting rock masses or similar masses comprising:

inserting explosive charges, each with a corresponding detonator (2), in boreholes (1), and according to which programming the detonators (2) and their respective time intervals with respect to one another depending on the mineralogical/geological surroundings and the resulting seismic speeds ($V_G$) and with regard to the respective firing pattern, wherein influencing reciprocally successive blastings with regard to the respective detonation sequence; wherein detonation delays are set between the first and last boreholes, the delays corresponding to a detonation speed (horizontal detonation speed $V_{ZH}$) which is equal to or higher than the speed of sound in the rock to be blasted (rock speed $V_G$) (in other words $V_{ZH} \geq V_G$).

2. The method as claimed in claim 1 further comprising inserting, electronic detonators (2) with gradually increasing and exactly adjustable detonation times.

3. The method as claimed in claim 1 or 2 further comprising increasing the explosive effect with individual shock wave fronts coming from the respective boreholes (1) interfering to open the structure of the rock to be blasted.

4. The method as claimed in any of claims 1 to 3, further comprising inserting an electronic base detonator and an electronic head detonator in a borehole (1), e.g. a large borehole, and programming to the same detonation time, and wherein as a result reverse traveling shock wave fronts or detonation fronts meet in the middle of the charge column with doubling of the detonation speed and accelerated conversion of the charge column.

5. The method as claimed in any of claims 1 to 4, further comprising determining the speed of sound ($V_G$) in the rock to be blasted by first determining by measurement and/or calculation through simulations.

6. The method as claimed in any of claims 1 to 5 further comprising, in addition to producing the seismic wave (sound wave) producing, a gas pressure wave with a lower propagation speed (detonation pressure wave speed) than the seismic wave is after conversion of the explosive, which supports the blasting.

7. The method as claimed in one of claims 1 to 6 further comprising adjusting the shock wave speed and the detonation pressure wave speed to each other and setting said shock wave speed and the detonation pressure wave speed in the super- or subsonic speed range, respectively.

8. The method as claimed in one of claims 1 to 7 further comprising synchronizing pre-crack blasting and production blasting so that vibrations in the blast area are neutralized.

9. A borehole pattern with individual boreholes (1) with explosive charges and corresponding detdonator(2) which are programmed in accordance with the method as claimed in any of claims 1 to 8 to achieve a desired firing pattern, a number of rows of boreholes (1) being used, the detonators (2) also being initiated with production of a detonator pattern covering all the rows, and setting the horizontal detonation speed ($V_{ZH}$) to be higher than the speed of sound ($V_G$) (in other words $V_{ZH} \geq V_G$).

10. The borehole pattern as claimed in claim 9, wherein the boreholes (1) are arranged in a triangular or circular configuration.

* * * * *